United States Patent

Miyachi et al.

[15] 3,675,346
[45] July 11, 1972

[54] SANDAL

[72] Inventors: Kiyoichi Miyachi; Shinsuke Hashino; Tomokazu Hongu, all of Fukuyama, Japan

[73] Assignee: Hiroshima Kasei, Ltd., Fukuyama-shi, Japan

[22] Filed: May 24, 1971

[21] Appl. No.: 146,313

[30] Foreign Application Priority Data

April 24, 1971 Japan..................................46/31883

[52] U.S. Cl..........................................................36/11.5
[51] Int. Cl..........................................................A43b 3/12
[58] Field of Search..............................36/11.5, 2.5 R, 9

[56] References Cited

UNITED STATES PATENTS

| 3,552,039 | 1/1971 | Fukuoka | 36/11.5 |
| 3,577,662 | 5/1971 | Fukuoka | 36/11.5 |

*Primary Examiner*—Patrick D. Lawson
*Attorney*—Flynn & Frishauf

[57] ABSTRACT

A sandal having a structure consisting of unfoamed surface layers, an internal closed-cell layer and intermediate open-cell layers. This improved sandal is produced by adding a foaming material comprising short lengths of fiber and a blowing agent to a thermoplastic resin, melting the resulting composition, forcing the melt into a fixed-cavity mold and cooling the melt to solidify.

7 Claims, 6 Drawing Figures

SANDAL

BACKGROUND OF THE INVENTION

1. Field of the Invention

This invention relates to an improvement of sandal. More particularly, the invention relates to a foamed thermoplastic resin sandal having an internal three-layer structure. To be more specific, the invention is directed to a foamed thermoplastic synthetic resin sandal consisting of a central closed-cell layer, a couple of intermediate open-cell layers one disposed on each side of said closed-cell layer, and a couple of unfoamed resin surface layers each disposed on the outer side of the corresponding open-cell layer.

2. Description of the Prior Art

Expanded thermoplastic resin products have been known in the art, and methods for the manufacture of them are disclosed in U.S. Pat. No. 3058161 and Japanese Pat. publication No. 22213/1964. In these methods, a thermoplastic resin composition containing a blowing agent is melted and forced into a mold and allowed to expand there before being chilled and solidified.

While these conventional methods have found application in the industry, there are nevertheless certain disadvantages that must be overcome. Some of the disadvantages are the poor thermal and dimensional stability of the expanded articles and the relatively high cost of manufacture.

SUMMARY OF THE INVENTION

A main object of the present invention is to provide a novel sandal of which a sandal main body and a strap main member are integrally and simultaneously molded.

A further object of the present invention is to provide a novel synthetic resin foam sandal having an internal three-layer structure.

A further object of the present invention is to provide a novel synthetic resin foam sandal having an internal three-layer structure, the main body of said sandal having a shank inside so as to provide durability and resistance against deformation of the sandal.

These objects can be accomplished by blending a foaming material comprising an intimate mixture of short lengths of fiber and a blowing agent with a thermoplastic synthetic resin or a thermoplastic synthetic resin composition containing a plasticizer, stabilizer and pigment, melting the blend, casting the melt into a metal mold having a fixed cavity and, finally, cooling the melt to solidify.

Still further objects and advantages of the present invention will appear from the following disclosure of a preferred form of embodiment thereof.

BRIEF DESCRIPTION OF THE DRAWINGS

FIG. I is a perspective view of the sandal according to the present invention:

FIG. II is a longitudinal sectional views of the sandal taken along the line II — II in FIG. I:

Figure 1:
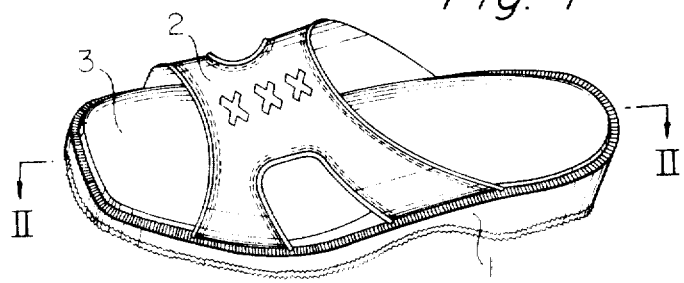
Figure 2:
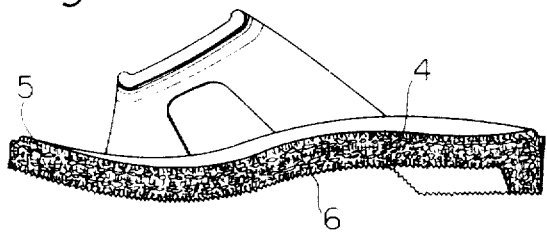
Figure 3:
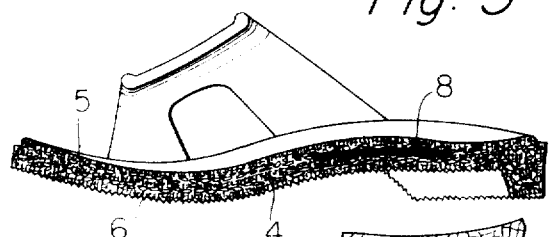
Figure 4:
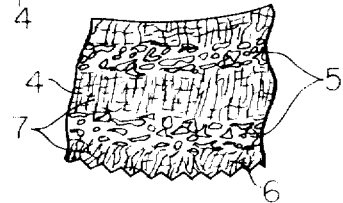
Figure 5:
Figure 6:
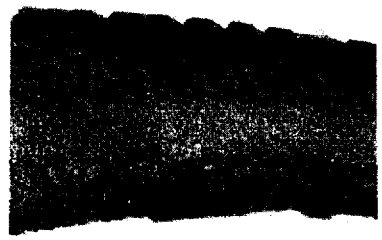

FIG. III is a perspective view of the sandal the main body of which has a shank inside:

FIG. IV is an enlarged drawing showing a cross-section of the sandal according to the present invention:

FIG. V is an enlarged photograph showing a cross-section of the sandal produced by a prior-art:

FIG. VI is an enlarged photograph showing a cross-section of the sandal according to the present invention.

DETAILED DESCRIPTION OF THE INVENTION

The present invention relates to a foamed thermoplastic synthetic resin sandal consisting of a central closed-cell layer a couple of intermediate open-cell layers, one disposed on each side of said closed-cell layer, and a couple of unfoamed resin surface layers each disposed on the outer side of the corresponding open-cell layer.

The novel thermoplastic resin foam sandals are integrally molded by a novel method characterized by blending a foaming material comprising an intimate mixture of short lengths of fiber and a blowing agent with thermoplastic synthetic resin or a thermoplastic synthetic resin composition containing a plasticizer, stabilizer and pigment, melting the blend, casting the melt into a metal mold having a fixed cavity and, finally, cooling the melt to solidify.

A synthetic resin sandal of which the sandal main body and a band are integrally and simultaneously molded and having a foamed interior portion and unfoamed surface layers is well known as a prior art.

However, the conventional type sandal has certain disadvantages including poor thermal and dimensional stability and relatively high manufacturing cost.

The conventional foamed thermoplastic synthetic resin sandal is produced by forcing a molten mass of a thermoplastic synthetic resin containing a blowing agent into a metal mold and, prior to cooling, allowing the mass to foam as the internal volume of the metal mold is increased. In this method, the portion of the molten blend which is in direct contact with the mold wall is cooled to yield a thin unfoamed surface layer which will directly contact the ground while an internal open-cell layer is produced.

The unfoamed surface layer of the sandal produced by the conventional method wears away in a short period of time and thereafter the internal foamed layer of the sandal directly contacts the ground. In short, the conventionally made sandals are not durable and do not give lasting protection to the feet. And furthermore, since the sole of the wearer's foot contacts the unfoamed inner layer. Such sandals are uncomfortable.

Referring now to FIG. II of the drawing, FIG. II shows the sandal of the present invention having an internal three-layer structure consisting of a central closed-cell layer 4 containing a suitable distribution of short lengths of fiber 7, a couple of intermediate open-cell layers 5 containing a suitable distribution of short lengths of fiber 7, one of said layers being disposed on each side of said closed-cell layer 4 and a couple of unfoamed resin surface layers 6 containing a suitable distribution of short lengths of fiber 7 each disposed on the side of the corresponding open-cell layer.

Referring now to FIG. III, the FIG. III shows the sandal equipped a shank 8 inside of the main body of the sandal shown in FIG. II.

Among the short lengths of fiber which can be employed in accordance with this invention are short lengths of natural fiber, (i.e. seed-hair fibers, fast fibers, leaf fibers, animal hair fibers, and silk fiber) and chemical and synthetic fibers (i.e. cellulosic fibers, protein fibers, polyamide fibers, polyvinyl alcohol fibers, polyvinylidene chloride fibers, polyvinyl chloride fibers, polyester fibers, polyacrylic fibers, polypropylene fibers, polyurea fibers, polyvinylidene cyanide fibers, polystyrene fibers, polyurethane fibers, polyfluoroethylene fibers, etc.) The preferred length of fiber is from 1.0 to 60 millimeters, and the preferred diameter is in the range of 0.001 to 0.5 millimeter.

Among the suitable blowing agents are diazocarbonamide, barium azodicarboxylate, 4,4'-oxybisbenzone sulfonyl hydrazide, trihydrazinotriazine, N,N'-dinitrosopentamethylenetetramine, azobibisisobutyro-nitrile, benzenesulfonyl hydrazide, toluenesulfonyl hydrazide, 3,3'-dihydrazinosulfonyldiphenylsulfone, N,N'-dinitroso-N,N'-dimethylterephthalamide, p-toluene-sulfonylsemicarbazide, p,p'-oxybisbenzenesulfonyl-semicarbazide, oxalic acid hydrazine, hydrazodicarbonamide, nitroguanidine, dimethyldinitrosoterephthalamide, diazoaminobenzene, azocyclohexylnitrile and the like.

Any known binder can be employed as a binding agent to be used for joining the blowing agent to the short lengths of fiber, insofar as it does not adversely affect the foaming capacity of the blowing agent. Thus, polyisocyanates (for example, Desmodur H.S, 15, M.C, R, RF, TT, HH, etc.) or binding compositions containing such polyisocyanates together with one or more of natural rubber, synthetic rubbers, for example, SBR (styrenebbutadiene rubber), NBR (nitrile-butadiene rubber), polyurethane, chloroprene, etc., and synthetic resins such as MMA (methyl methacrylate), EVA (ethylenevinyl acetate copolymer), etc. can be employed to advantage.

Among the thermoplastic resins which can be employed in accordance with this invention are polyvinyl chloride, polyethylene, polypropylene, polystyrene, vinyl chloride-ethylene-vinyl acetate copolymer, ethylene-vinyl acetate copolymer, acrylonitrile butadiene-styrene copolymer (ABS) and the like.

In accordance with this invention, the blend of said foaming material and said thermoplastic resin composition is forced into a mold using a molding machine which may be of the conventional type. Among the suitable molding machines are injection machines, and particularly preferred is an injection molding machine provided with a check valve at the forward end of its screw or one provided with a nozzle having valve means.

PREFERRED EMBODIMENTS OF THE INVENTION

Example 1

A foaming material was prepared as follows.

650 parts toluene 100 parts methyl ethyl ketone (containing 5 parts of polyurethane elastomer)

100 parts short lengths of fiber (cotton, 1–60 mm long, 0.01–0.05 mm in dia.)

30 parts azodicarbonamide 50 parts Desmodur RF

The above ingredients were charged into a gelation tank, which was maintained at a temperature of 80° C. The charge was stirred well at an agitation speed of 950 r.p.m. After the solvent was evaporated, the mixture was fed to a cooling mixer, wherein it was cooled and loosened.

Two powdered synthetic resin compositions were prepared in the following manners.

Formulas
A: Conventional method
| | |
|---|---|
| Polyvinyl chloride resin | 100 parts |
| Pigment | 1.5 " |
| Stabilizer | 3.0 " |
| DOP | 95 " |
| Epoxy type plasticizer | 10 " |
| Foaming agent (*Viny for AC (registered trademark) | 1.0 part |

*Azodicarbonamide type foaming agent

B: Method of this invention
| | |
|---|---|
| Polyvinyl chloride resin | 100 parts |
| Pigment | 1.5 " |
| Stabilizer | 3.0 " |
| DOP | 95 " |
| Epoxy type plasticizer | 10 " |
| Foaming material above described | 15 " |

The polyvinyl chloride resin, pigment and stabilizer were charged into a gelation tank, which was maintained at a temperature of 100° C. The charge was stirred well at an agitation speed of 950 r.p.m. and when the resin temperature reached 80° C, the plasticizer, DOP, epoxy resin and the foaming material, which had been preheated to 80° C, were added, followed by further stirring. The slurry was fed to a cooling mixer, where it was cooled to 50° C. The above procedure yielded a powdery expandable synthetic resin compound embodying the principle of this invention. A foamed article having an internal three-layer structure was prepared as follows. In this example, an inline-screw injection molding machine equipped with a nozzle having valve means was used and the cylinder temperature was set at 140° C to 180° C. Other settings were; injection pressure 90 kg/cm², injection speed - maximum; back pressure 15–30 kg/cm². The molten thermoplastic resin compound was directly injected into a mold having a fixed cavity.

Since the cylinder of the injection machine is pressure-loaded, the expandable synthetic resin compound remains unfoamed even at its foaming temperature but, when it reaches the mold, the compound starts expanding at foaming sites adjacent the short lengths of fiber. However, across the contact face between the mold and the melt, the compound is cooled to yield unfoamed skin layers, while an open-cell layer is produced adjacent each of the skin layers by the cumulative action of the molding temperature, the foaming capacity of the blowing agent on the surface of fiber and the flow of the mass. However, because the metal mold has a fixed cavity, there is no decompression effect, the effect which is associated with molds which are expandable in volume, with the result that a closed-cell layer is produced in the internal zone. The final product, therefore, features a three-layer internal structure comprising an internal closed-cell layer and a couple of open-cell layers disposed on both sides of said closed-cell layer, each of said layers containing a suitable distribution of short lengths of fiber. The prior-art techniques of injecting a thermoplastic resin compound containing a blowing agent into an expandable mold gave rise to products which feature smooth cooled skin layers and a single internal closed-cell structure. The difference between the product of this invention and the conventional product will be seen from FIGS. V and VI. FIG. V is an enlarged photograph showing a cross-section of the foam produced from the above conventional formulation by injecting the melt into a mold having an expandable cavity. It is clearly seen that this product consists of thin skin-like unfoamed layers and a compact closed-cell internal layer.

FIG. VI is an enlarged photograph showing a cross-section of the foam produced from the above formulation containing the foaming material by injecting the melt into a fixed-cavity mold. It clearly shows that this product consists of relatively thick skin-like layers, an internal closed-cell layer and intermediate open-cell layers.

Table 1 shows the specific gravity, void volume, water absorption, thermal shrinkage and other properties of the foamed product of this invention in comparison with those of the conventional product.

TABLE 1

| Item of experiment | Sandal of this invention unfoamed surface, an internal closed-cell layer and intermediate open-cell layers | Conventional Sandal produced by conventional method unfoamed surface, an internal and a compact closed-cell internal layer |
|---|---|---|
| Internal structure | | |
| Specific gravity | 0.25 | 0.26 |
| Void volume | 76.2 | 69.5 |
| Water absorption, | | |
| 6 hrs. | 4.8 | 0.9 |
| 24 hrs. | 6.5 | 1.5 |
| Thermal shrinkage (70°C, 2 hrs.) | 0.20 | 0.31 |
| Gas permeability (3 hrs., alcohol loss) | 0.25 | 0.11 |

(NOTE) Specific gravity: Measured according to ASTMD 1565-60T

Void volume: The specific gravity of the product divided by the apparent gravity of the unfoamed molding composition as expressed in percentage.

$$\text{Void volume} = 100 \times \left(1 - \frac{\text{Apparent gravity of foam}}{\text{Apparent gravity of unfoamed material}}\right)$$

Gas permeability: Alcohol is put in a specified vessel and a sheet specimen of the foam (approx. 1 mm thick) is placed over the vessel to provide a gas-tight seal. After 3 hours, the weight less is measured.

Water absorption: According to JIS K6705, A test strip 20 × 20 × 20 mm is placed in fresh water at a dipth of 25 mm for 25 hours, at the end of which time it is taken out. The water absorption of the test strip is calculated by means of the following equation.

$$\text{Water absorption (percent)} = \frac{\text{Weight after immersion} - \text{initial weight}}{\text{Initial length} \times \text{width} \times \text{thickness}} \times 100$$

Thermal shrinkage: A test piece, 250 × 100 × 10 mm, is marked at two points spaced apart by 200 mm along its centerline and allowed to stand in an air bath at 70° ± 2° for 2 hours. The piece taken out is allowed to cool at room temperature for 1 hour and the spacing of the markings is measured. Then, the thermal shrinkage of the specimen is calculated by means of the following equation.

Thermal shrinkage (%) = $(L_0 - L_1)/(L_1) \times 100$ where $L_0$ denotes the original distance between markings (mm); and $L_1$ denotes the distance between markings after heating.

The difference in thickness of outer sole, between the sandal of this invention and the conventional sandal can be seen from the photographs of FIGS. V and VI and above comparative date. Whereas closed-cell foams generally tend to shrink or expand due to the residual internal strain originating from the foaming step, the sandal of this invention, which contains open cells, is dimensionally stable as will be seen from its low shrinkage value. Secondly, the disadvantages of a closed-cell layer, such as low dimensional stability and poor cushioning property, are now obviated by the high dimensional stability and other features of the open-cell layer 5, while the low abrasion resistance and poor flexibility of an open-cell layer 5 are compensated for by the high resistance and flexibility of the internal closed-cell layer 4 and unfoamed surface layers.

Furthermore, the intermediate open-cell layers 5 provides improved cushioning (shock-absorbing) effect. In addition, because the sandal of this invention is integrally foamed, it remains serviceable for a relatively long period of time. The uniform distribution of short lengths of fiber 7 assists in gas permeability, dimensional stability and resistance cold.

Furthermore, because short lengths of fiber are distributed in interlacing relation throughout the surface layers, the sandal of this invention has a leather-like texture or hand which is absent in ordinary synthetic resin sandals.

Since the foamed sandal of this invention is produced by injecting a melt thermoplastic resin containing a foaming material comprising short lengths of fiber and a blowing agent into a fixed-cavity mold and cooling the melt to solidify, the unfoamed layer which is in direct contact with the ground, that is, the sole of the sandal, is made thick and hence improves the durability of the sandal of this invention.

As described above, the sandal of this invention is durable and has an improved cushioning (shock-absorbing) effect and dimensional stability. And accordingly, the sandal of this invention is well fitting and easy to wear in comparison with the conventional sandal.

And also the sandal of this invention is superior to the conventional one in fit and comfortableness.

Furthermore, because short lengths of fiber 7 are distributed in interlacing relation throughout the unfoamed surface layer 6, the sandal of this invention has a leather-like texture of hand which is absent in ordinary synthetic sandals.

We claim:

1. A sandal comprising a main body and a strap which are integrally molded of synthetic resin, said main body consisting of a central closed-cell layer containing a suitable distribution of short lengths of fiber, a couple of intermediate open-cell layers containing a suitable distribution of short lengths of fiber one disposed on each side of said closed-cell layer and a couple of unfoamed resin surface layers containing a suitable distribution of short lengths of fiber one disposed on each of the outer sides of the corresponding open-cell layer.

2. The sandal of claim 1 wherein the sandal is integrally molded by adding a foaming material comprising short lengths of fiber and a blowing agent to a thermoplastic resin, melting the resulting composition, forcing the melt into a fixed-cavity mold and cooling the melt to solidify.

3. The sandal of claim 1 wherein a shank is inserted in the main body at the time of molding.

4. The sandal of claim 3 wherein the shank is press-board.

5. The sandal of claim 3 wherein the shank is wood.

6. The sandal of claim 3 wherein the shank is leather.

7. The sandal of claim 3 wherein the shank is steel.

* * * * *